(12) United States Patent
Dalsgaard

(10) Patent No.: US 10,340,782 B2
(45) Date of Patent: Jul. 2, 2019

(54) METHOD OF REDUCING SOUND FROM LIGHT FIXTURE WITH STEPPER MOTORS

(71) Applicant: Harman Professional Denmark ApS, Aarhus (DK)

(72) Inventor: Carsten Dalsgaard, Silkeborg (DK)

(73) Assignee: Harman Professional Denmark APS, Aarhus (DK)

( * ) Notice: Subject to any disclaimer, the term of this patent is extended or adjusted under 35 U.S.C. 154(b) by 0 days.

(21) Appl. No.: 15/892,897

(22) Filed: Feb. 9, 2018

(65) Prior Publication Data

US 2018/0234001 A1    Aug. 16, 2018

(30) Foreign Application Priority Data

Feb. 10, 2017 (DK) .................................. 2017 00088
Feb. 10, 2017 (DK) .................................. 2017 00091
Feb. 10, 2017 (DK) .................................. 2017 00092

(51) Int. Cl.

| | |
|---|---|
| *F21S 8/00* | (2006.01) |
| *H02K 37/22* | (2006.01) |
| *F21S 10/00* | (2006.01) |
| *F21V 21/15* | (2006.01) |
| *F21V 21/30* | (2006.01) |
| *H02K 37/24* | (2006.01) |
| *F21S 10/02* | (2006.01) |
| *F21V 14/06* | (2006.01) |
| *F21W 131/406* | (2006.01) |
| *F21Y 115/10* | (2016.01) |

(52) U.S. Cl.
CPC ............ *H02K 37/22* (2013.01); *F21S 10/007* (2013.01); *F21V 21/15* (2013.01); *F21V 21/30* (2013.01); *H02K 37/24* (2013.01); *F21S 10/02* (2013.01); *F21V 14/06* (2013.01); *F21W 2131/406* (2013.01); *F21Y 2115/10* (2016.08)

(58) Field of Classification Search
USPC ......................................................... 362/277
See application file for complete search history.

(56) References Cited

U.S. PATENT DOCUMENTS

| | | | |
|---|---|---|---|
| 3,545,301 | A | 12/1970 | Richter |
| 6,152,577 | A | 11/2000 | Rizkin et al. |

(Continued)

FOREIGN PATENT DOCUMENTS

| | | |
|---|---|---|
| EP | 0246742 A1 | 11/1987 |
| EP | 0283234 A2 | 9/1988 |

(Continued)

*Primary Examiner* — Tuyen K Vo
(74) *Attorney, Agent, or Firm* — Brooks Kushman P.C.

(57) ABSTRACT

A light fixture including a stepper motor comprising a stepper motor stator and a stepper motor rotor. The stepper motor rotor includes a stepper motor axle and is rotatable around a stepper motor axis. The stepper motor is connected to a movable object and is configured to move the movable object in relation to a reference point. A damping mass is attached to the stepper motor axle. The damping mass has a rotational inertia in relation to the stepper motor axis which is at least as large as the rotational inertia of the stepper motor rotor in relation to the stepper motor axis. A method of damping the sound generated by a light fixture comprising a step of attaching a damping mass to a stepper motor axle.

20 Claims, 11 Drawing Sheets

(56) References Cited

U.S. PATENT DOCUMENTS

| | | | | |
|---|---|---|---|---|
| 7,789,543 B2* | 9/2010 | Manscher | ............... | F21S 6/00 362/272 |
| 2008/0062692 A1* | 3/2008 | Andersen | ............ | F21S 10/007 362/275 |
| 2009/0109680 A1 | 4/2009 | Belliveau et al. | | |
| 2009/0310375 A1* | 12/2009 | Manscher | ............... | F21S 6/00 362/399 |
| 2012/0147333 A1* | 6/2012 | Jorgensen | ............ | G03B 33/06 353/31 |
| 2013/0027442 A1* | 1/2013 | Jorgensen | ............ | F21S 10/007 345/690 |
| 2014/0301071 A1* | 10/2014 | Jorgensen | ............. | F21V 14/06 362/231 |
| 2016/0215961 A1* | 7/2016 | Kjeldsen | ............... | F21V 14/06 |

FOREIGN PATENT DOCUMENTS

| | | |
|---|---|---|
| EP | 0774616 A2 | 5/1997 |
| EP | 2927579 A1 | 10/2015 |
| JP | H06327221 A | 11/1994 |
| JP | 2012115082 A | 6/2012 |
| WO | 0137032 A2 | 5/2001 |
| WO | 2007122459 A2 | 11/2007 |
| WO | 2012032321 A1 | 3/2012 |

* cited by examiner

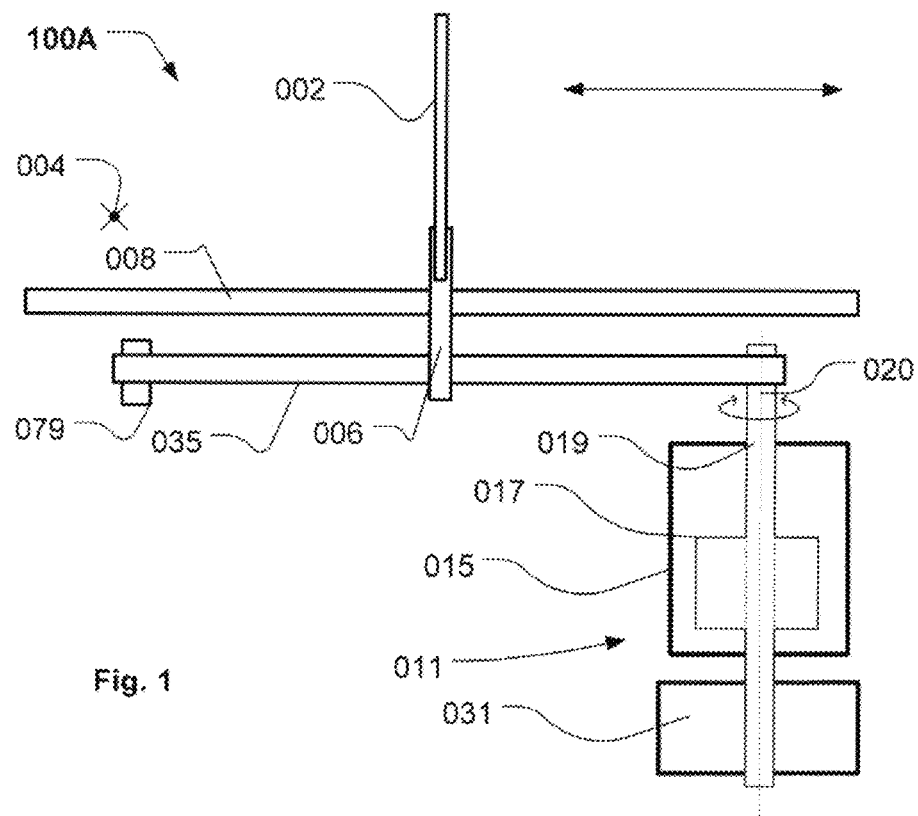
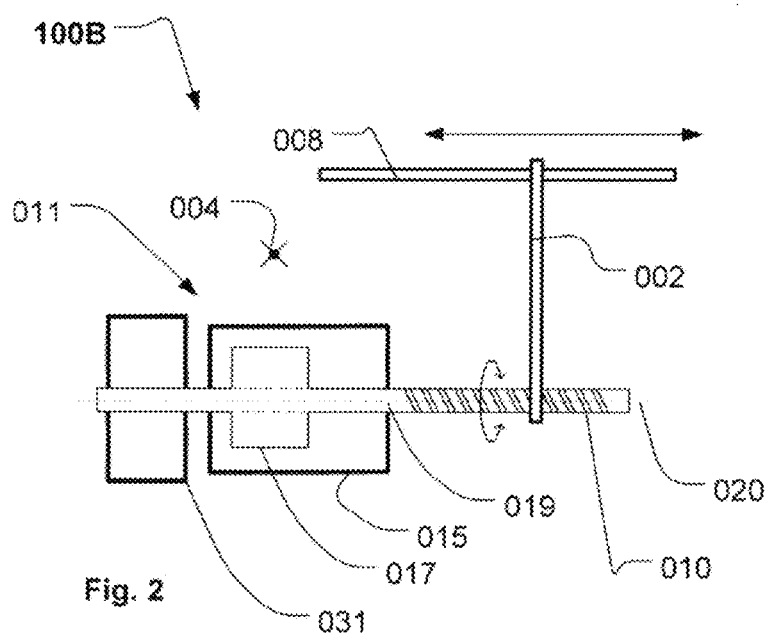

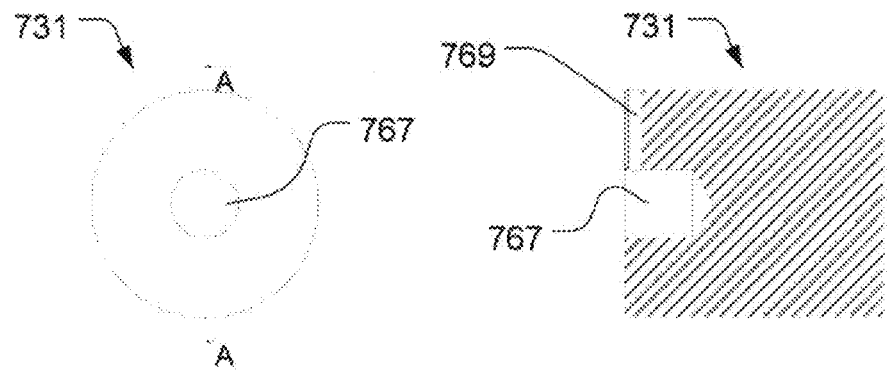
Fig. 11
Fig. 12
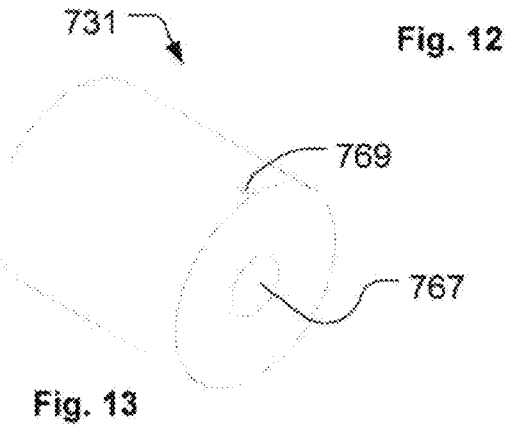
Fig. 13
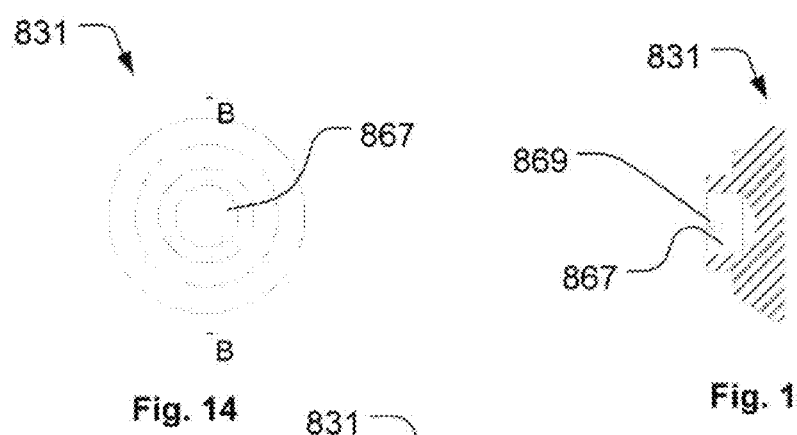
Fig. 14
Fig. 15
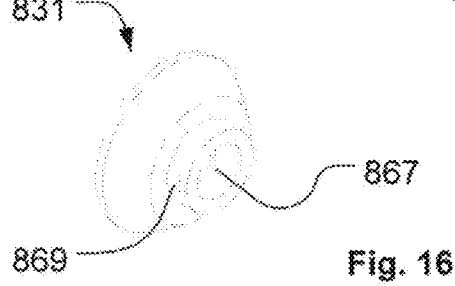
Fig. 16

METHOD OF REDUCING SOUND FROM LIGHT FIXTURE WITH STEPPER MOTORS

CROSS-REFERENCE TO RELATED APPLICATIONS

This application claims foreign priority benefits under 35 U.S.C. § 119(a)-(d) to DK Application Serial No. PA 201700088 filed Feb. 10, 2017, DK Application Serial No. PA 201700091 filed Feb. 10, 2017, and DK Application Serial No. PA 201700092 filed Feb. 10, 2017 the disclosure of which is hereby incorporated in its entirety by reference herein.

TECHNICAL FIELD

The present invention relates to light fixtures comprising a light source generating a light beam. The light fixture may comprise a support structure and a rotatable structure rotatably connected to the support structure, where a light source is arranged in the rotatable structure and creates a light beam. Such light fixture can for instance be a moving head light fixture comprising a base, a yoke and a head, where the yoke is rotatable in relation to the base around a yoke axis and the head is rotatable around a head axis in relation to the yoke.

BACKGROUND

In order to create various light effects and mood lighting in connection with concerts, live shows, TV shows, sport events or as a part of an architectural installation light fixtures creating various effects are getting more and more used in the entertainment industry. Typically, entertainment light fixtures create a light beam having a beam width and a divergence and can for instance be wash/flood fixtures creating a relatively wide light beam with a uniform light distribution or it can be profile fixtures adapted to project image onto a target surface.

Typically, such light fixtures comprise a least one light source generating a light beam propagating along an optical axis and an optical assembly configured to project the light beam along the optical axis. Light fixtures for entertainment can comprise a number of light effect components which are configured to be inserted into the light beam in order to provide different light effects. The light effect components can for instance be any light effects known in the art of intelligent/entertainments lighting, for instance a CMY color mixing system, color filters, gobos, animation effects wheels, iris diaphragms, focus lenses, zoom lenses, prism effect components, framing systems or any other light effects known in the art. Moving head light fixture comprising a base, a yoke and a head are often used in connection with entertainment lighting as they, in addition to the light effects described above, can also direct the light into various directions.

Light designers and programmers want as many effects as possible in a light fixture as this gives the light designer and programmers many options when creating light shows. Additionally light designers and programmers constantly also have a desire to have a silent light fixture were the noise generated by the light fixture is as low as possible.

U.S. Pat. No. 3,545,301 discloses a vibration damper for mounting on the output shaft of an electrical stepping motor wherein a viscoelastic absorber element is fixedly interposed between the motor output shaft and a damping mass, with the polar mass moment of inertia of the latter being a function of the polar mass moment of inertia of the motor armature. The polar mass momentum of inertia of damping mass is taken to be in the range of 10 to 60% (preferably 50%) of that of the motor.

SUMMARY

The object of the present invention is to provide a moving head light fixture and light effect system which reduces the limitations with the prior art moving head light fixtures and light effect systems.

This is achieved by providing a light fixture according to the claimed invention where the light fixture comprises: at least one light source generating a light beam, and a stepper motor comprising a stepper motor stator and a stepper motor rotor. The stepper motor rotor in which a stepper motor axle and is rotatable around a stepper motor axis. The stepper motor is connected to a movable object and is configured to move the movable object in relation to a reference point. A damping mass is attached to the stepper motor axle. The damping mass has a rotational inertia in relation to the stepper motor axis which is at least as large as the rotational inertia of the stepper motor rotor in relation to the stepper motor axis.

Additionally, this is achieved by a method of damping the sound generated by a light fixture according to the claimed invention, where the light fixture includes: at least one light source generating a light beam, a movable object, and a stepper motor that is configured to move the movable object. The stepper motor includes a stepper motor stator and a stepper motor rotor. The stepper motor rotor includes a stepper motor axle and is rotatable around a stepper motor axis.

The method includes the step of attaching a damping mass to the stepper motor axle where the damping mass has a rotational inertia in relation to the stepper motor axis which is at least as large as the rotational inertia of the stepper motor rotor in relation to the stepper motor axis.

Providing a damping mass having a rotational inertia in relation to the stepper motor axis which is at least as large as the rotational inertia of the stepper motor rotor in relation to the stepper motor axis, results in the effect that the vibrations created by the stepper motor are reduced whereby the sound generated by the light system is reduced.

The advantages and benefits of the invention are described in more detail in the detailed description of the invention and the dependent claims describe further embodiments of the invention.

BRIEF DESCRIPTION OF THE DRAWINGS

FIG. 1 illustrates a stepper motor system used in the light fixture according to the present invention;

FIG. 2 illustrates a stepper motor system used in the light fixture according to the present invention.

FIG. 11 illustrates a damping mass for a stepper motor system of a light fixture;

FIG. 12 illustrates a damping mass for a stepper motor system of a light fixture;

FIG. 13 illustrates a damping mass for a stepper motor system of a light fixture;

FIG. 14 illustrates another damping mass for a stepper motor system of a light fixture;

FIG. 15 illustrates another damping mass for a stepper motor system of a light fixture;

FIG. 16 illustrates another damping mass for a stepper motor system of a light fixture;

DETAILED DESCRIPTION

The present invention is described in view of exemplary embodiments only intended to illustrate the principles of the present invention. The skilled person will be able to provide several embodiments within the scope of the claims. In the illustrated embodiments the illustrated light beams and optical means do only serve to illustrate the principles of the invention rather than illustrating exact and precise light beams and optical means. Throughout the description the reference numbers of similar elements providing similar effects have the same last two digits.

Figure 6:
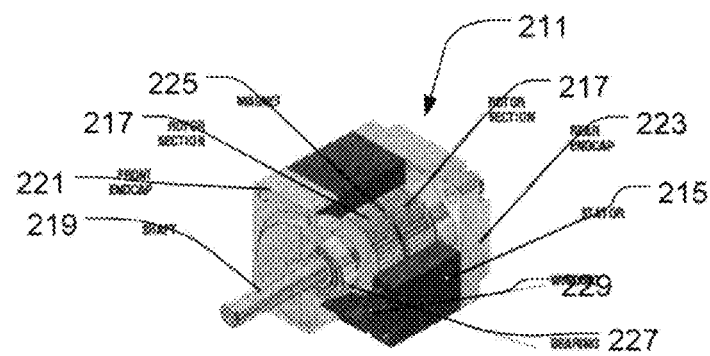
FIG. 6 illustrates a stepper motor according to the prior art.

FIGS. 1-4 illustrate structural diagrams of different embodiments of a stepper motor system 100A-100D according to the present invention. Each of the stepper motor systems 100A-100D comprises a stepper motor 011 comprising a stepper motor stator 015 and a stepper motor rotor 017. The stepper motor rotor 017 comprises a stepper motor axle 019 rotatable around a motor axis 020. The stepper motor 011 can be any stepper motor known in the art of stepper motors for instance similar to the stepper motor illustrated in FIG. 6 illustrating a stepper motor 211 according to the prior art. The skilled person also realizes that the stepper motor is controlled by some electronics (not shown) for instance driving circuits and/or micro controllers as known in the art of stepper motors.

The stepper motor 011 is connected to a movable object 002 and is configured to move the movable object 002 in relation to a reference point 004. The movable object 002 can be any object which can be moved in relation to the reference point 004, for instance, components of a light fixture where for instance light modifying elements are moved in relation to a light beam in order to modify the light beam, in moving head light fixtures where a movable structure can be moved in relation to a stationary structure. The reference point 004 is illustrated as an arbitrary point and it is to be understood that the reference point can be any point in relation to which the movable object 002 is movable by translation and/or rotation.

A damping mass 031 is attached to the stepper motor axle 019 and has a rotational inertia in relation to the stepper motor axis 020 which is at least as large as the rotational inertia of the stepper motor rotor 017 in relation to the stepper motor axis 020. The damping mass reduces the sound generated by the stepper motor 011 system during movement of the movable object 002 in relation to the reference point, as the damping mass reduces the vibrations generated by the stepper motor 011 upon rotation of the stepper motor rotor 017. These vibrations are typically transferred into soundwaves hearable by the human ear. The stepper motor 011 is connected to the other parts of the stepper motor system and also typically forms part of an apparatus such as light fixtures, and the vibrations can thus be transferred to other parts of the stepper motor system or apparatus and thereby enhance the sound waves. Reducing the vibration caused by vibration of the stepper motor rotor 017 upon rotation of the stepper motor 011 will thus reduce the hearable sound generated upon movement of the movable object 002. Adding the damping mass with an inertia at least as large at the inertia of the stepper motor rotor 017 reduces the vibrations of the stepper motor rotor 017 as the angular momentum generated by the additional inertia takes up the vibrations as the forces from vibrations need to change the angular momentum of the rotating damping mass angular momentum and thus less vibrations can be transformed into soundwaves. That the inertia of the damping mass is at least as large at the inertia of the stepper motor rotor 017 ensures that the angular momentum provided by the damping mass is at least as large as the angular momentum of the stepper motor rotor 017 and the damping mass is thus capable of taking up vibrations caused by the stepper motor 011.

As can be seen from the drawings, the damping mass can be attached to stepper motor axle 019 at a position outside the stepper motor stator. As a consequence the damping mass can be applied to the stepper motor 011 without modifying the stepper motor 011 and the damping mass can thus be applied to any standard stepper motor. This makes is further possible to apply the damping mass to existing light fixtures comprising stepper motors whereby the sound generated during use of the stepper motor can be reduced.

In the embodiment shown in FIG. 1, the stepper motor 011 is connected to the movable object 002 via a belt mechanism comprising a belt 035 suspended by the stepper motor axle 019 and a pulley 079. Rotation of the stepper motor axle by the stepper motor causes the belt to rotate around the stepper motor axle 019 and the pulley. A carrier 006 is movably connected to a guiding track 008 and is fixed to the belt 035, as a consequence the carrier 006 will move along the guiding track upon rotation of the belt. The carrier 006 is configured to carry the movable object 002 which as a consequence moves along the guiding track upon rotation of the belt by the stepper motor 011. Thus, the stepper motor 001 is configured to transitionally move the movable object in relation to the reference point.

In the embodiment shown in FIG. 2, the stepper motor axle 019 is formed as a spindle 010 having a thread. The movable object is connected to the spindle 010 via a mating mechanism (not shown) which can be screwed on to the thread of the spindle 010. The other end of the mating mechanism is movably connected to a guiding track 008 which is substantially parallel with the spindle 010. Rotation of the stepper motor axle 019 by the stepper motor 011 causes the spindle 010 to rotate and the movable object to move along the guiding track and the spindle.

Figure 3:
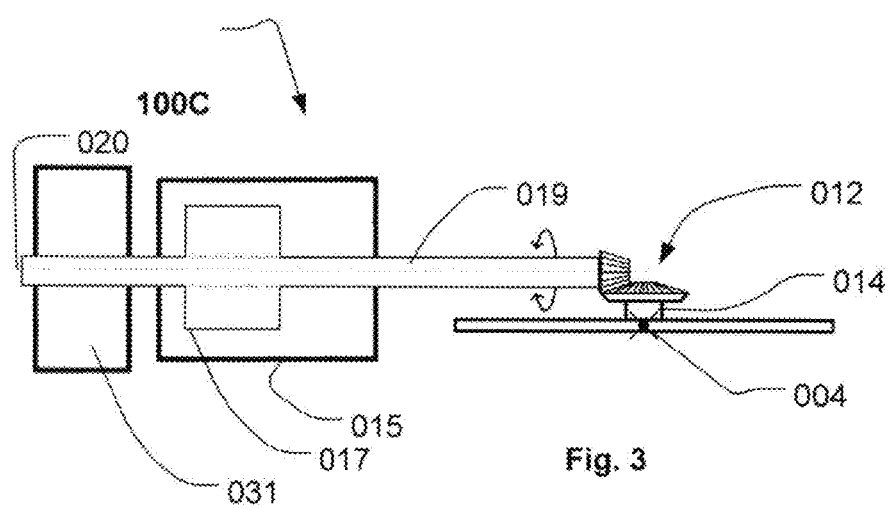
FIG. 3 illustrates a stepper motor system used in the light fixture according to the present invention.

In the embodiment shown in FIG. 3, the stepper motor 011 is connected to the movable object 002 via a gearing mechanism formed as a bevel gear 012 where the axes of the two shafts intersect and are angled in relation to each other. Here, the motor axle 019 constitutes one axle and a second axle 014 constitutes the other axle. The movable object 002 is connected to the end of the second axle 014 and rotates thus in relation to the axis of the second axle 014 and the reference point is here positioned at the second axle 014 and at the center of the movable object. Thus, the stepper motor is configured to rotate the movable object in relation to the reference point. It is noted that any gearing mechanisms can be used, for instance, a mechanism where the stepper motor axle 019 and the second axle 014 are parallel or systems where the coupling between the stepper motor axle 019 and the second axle 014 is provided vie belts, chains or the like.

Figure 4:
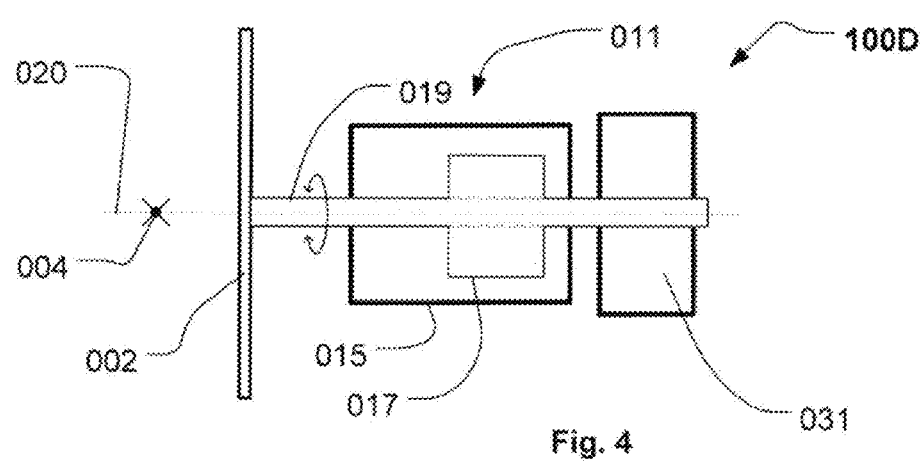
FIG. 4 illustrates a stepper motor system used in the light fixture according to the present invention.

In the embodiment shown in FIG. 4, the movable object 002 is coupled directly to the end to the stepper motor axle 019 and is thus rotated directly by the stepper motor 011.

In one embodiment, the damping mass has a mass which is at least as large as the mass of the stepper motor rotor 017. This ensures that the physical dimensions of the damping mass can be provided to have the substantially the same size as the stepper motor rotor 017.

In one embodiment, the damping mass is rotationally symmetric around the rotation axis of the stepper motor axle 019. As a result, vibrations caused by rotation of the damping mass 031 in relation to the rotation of the stepper motor 017 can be avoided.

The damping mass 031 can also be provided as a "wheel" having a rim and a number of spokes where most of the mass is provided in the rim. This makes it possible to provide a damping mass 031 having a high rotational inertia at a lower weight as by arranging more of the mass at larger distance from the center of rotation the inertia is increased. It is noted that the inner part of the damping mass as an alternative to the spokes can be provided as a thin disc where the rim then is thicker than the disc. Additional holes/opening can also be provided at the center part of the damping mass 031 in order to reduce the mass without reducing the rotational inertia too much.

Figure 5:
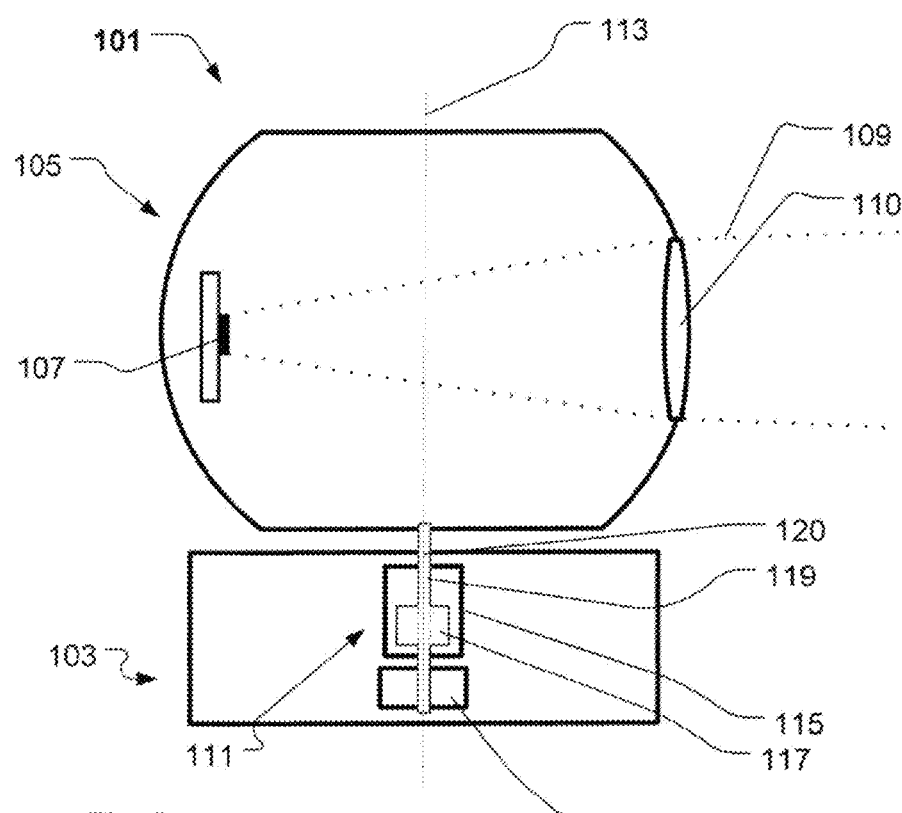
FIG. 5 illustrates a light fixture where a rotatable structure is rotated by a stepper motor system.

FIG. 5 illustrates a structural diagram of a light fixture 101 according to one aspect of the present invention. The light fixture 101 comprises a support structure 103 and a rotatable structure 105. The rotatable structure 105 comprises at least one light source 107 generating a light beam 109 (illustrated in dotted lines). The light source 107 is illustrated as a LED (light emitting diode) arranged inside the rotatable structure 105 and the light beam 109 exits the rotatable structure 105 through an emitting window 110. The light source 107 can be any kind of light source 107, for instance incandescent lamps, discharge lamps, plasma lamps, LEDs (light emitting diodes), OLEDs (organic LEDs), PLEDs (polymer LEDs) or combinations thereof. The emitting window 110 is shown as an optical lens configured to deflect the light beam 109, however, it is noticed that the light emitting window 110 can be provided as any component allowing the light beam 109 to propagate through the head housing, such as optical lenses, clear areas, or as an opening in the housing. Additionally, it is noticed that the light source 107 can also be arranged at the outer surface of the rotatable structure 105.

An actuator 111 is adapted to rotate the rotatable structure 105 around a rotation axis 113. The actuator 111 is a stepper motor comprising a stepper motor stator 115 and a stepper motor rotor 117. The stepper motor rotor 117 comprises a stepper motor axle 119 rotatable around a motor axis 120 (aligned with the rotation axis 113). The stepper motor can be any stepper motor known in the art of stepper motors, for instance similar to the stepper motor illustrated in FIG. 6 illustrating a stepper motor 211 according to the prior art. The stepper motor 211 comprises a stepper motor stator 215 connected to a front endcap 221 and a rear endcap 223. A part of the stator 215 and the front endcap 221 has been cut away allowing seeing into the stepper motor 211 where the stepper motor rotor 215 is arranged. The stepper motor rotor 215 comprises a magnet 225 attached to the stepper motor axle 219 and a part of the stepper motor axle 219 extends through the front endcap 221 and/or the rear endcap 223. At least one bearing 227 rotationally supports the stepper motor rotor in relation to the stepper motor stator. The stator comprises a number of windings 229 which can be electrically energized causing the stepper motor to rotate as known in the art. The stepper motor 211 illustrated in FIG. 6 illustrates only one possible embodiment of the stepper motor 211 and the skilled person understands that any kind of stepper motor can be used. The skilled person also realizes that the stepper motor is controlled by some electronics (not shown), for instance driving circuits and/or micro controllers as known in the art of stepper motors.

Returning to FIG. 5, a damping mass 131 is attached to the stepper motor axle 119 and the damping mass 131 has a rotational inertia in relation to the stepper motor axis 120 which is at least as large as the rotational inertia in relation to the stepper motor axis 120 of the stepper motor rotor 117.

The damping mass 131 reduces the sound generated by the light fixture 101 during rotation of the rotatable structure 105 in relation to the support structure 103, as the damping reduces the vibrations generated by the stepper motor upon rotation of the stepper motor rotor 115. These vibrations are typically transferred into soundwaves hearable by the human ear. The stepper motor is connected to the support structure 103 and the rotatable structure 105 and the vibrations can thus be transferred to these parts of the light fixture 101 and thereby enhance the sound waves. Reducing the vibration caused by vibration of the stepper motor rotor 115 upon rotation of the stepper motor will thus reduce the hearable sound generated upon rotation of the rotatable structure 105 in relation to the support structure 103. Adding the damping mass 131 with a rotational inertia at least as large as the rotational inertia of the stepper motor rotor 115 reduces the vibrations of the stepper motor rotor 115 as the angular momentum generated by the additional inertia takes up the vibrations as the forces from vibrations need to change the angular momentum of the rotating damping mass 131 and thus less vibrations can be transformed into soundwaves. That the rotational inertia of the damping mass 131 is at least as large at the inertia of the stepper motor rotor 117 ensures that the angular momentum provided by the damping mass 131 is at least as large as the angular momentum of the stepper motor rotor 117 and the damping mass 131 is thus capable of taking up vibrations caused by the stepper motor.

In FIG. 5 the stepper motor is arranged in the stationary structure, however, it is to be understood that the stepper motor also can be arranged in the rotatable structure 105 and rotate together with rotatable structure 105.

Figure 7:
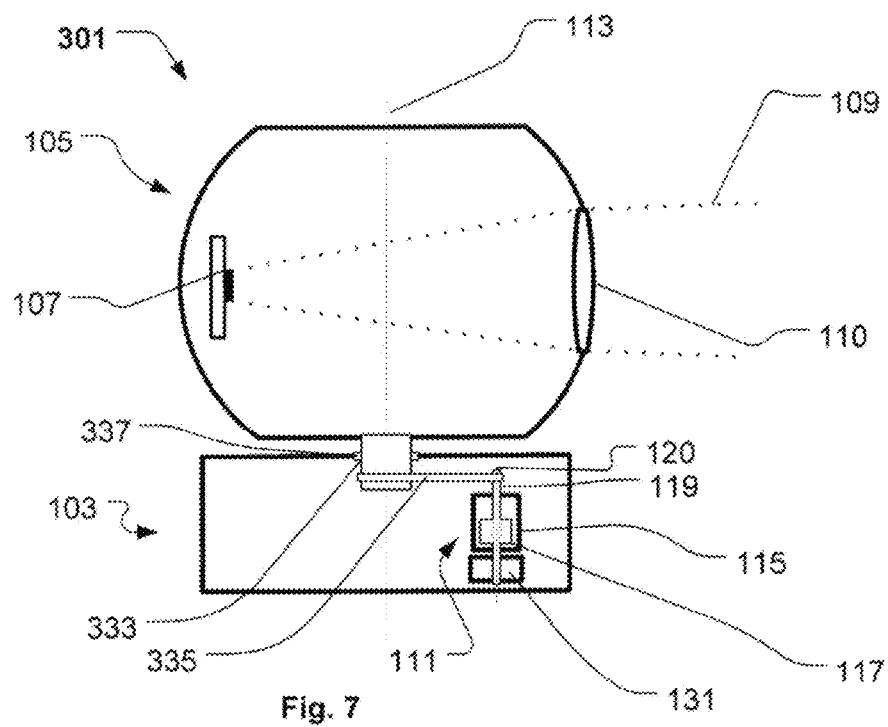
FIG. 7 illustrates another embodiment of a light fixture where a rotatable structure is rotated by a stepper motor system.

FIG. 7 illustrates a structural diagram of a light fixture 301. The light fixture 301 is substantially identical to the light fixture 101 illustrated in FIG. 5 and identical features have been given the same reference numbers as in FIG. 5 and will not be described further. In this embodiment, the stepper motor 111 is connected to a rotation wheel 333 via a belt 335 and the rotation wheel 333 is aligned with the rotation axis 113. The stepper motor 111 is arranged at the support structure 103 and the stepper motor 111 is configured to drive the belt 335 in relation to the rotation wheel 333 causing the rotatable structure 105 to rotate around the rotation axis 113. The rotation wheel 333 is fixed to the rotatable structure 105 and is formed as a shaft or attached to a shaft which is rotatably mounted in the stationary structure 103; for instance via a bearing 337 or any other structure allowing the rotation of the rotatable structure 105 in relation to the stationary structure.

Figure 8:
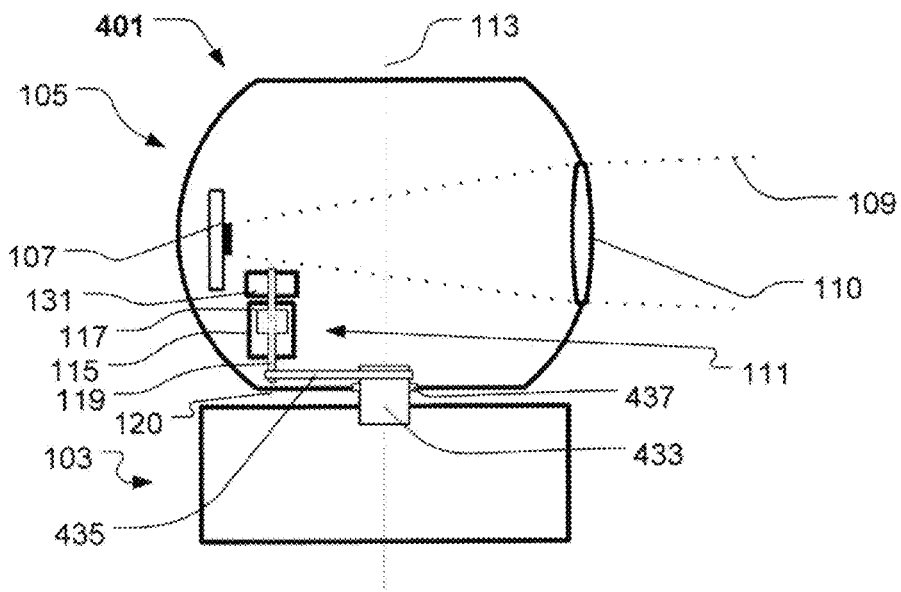
FIG. 8 illustrates another embodiment of a light fixture where a rotatable structure is rotated by a stepper motor system.

FIG. 8 illustrates a structural diagram of a light fixture 401. The light fixture 401 is substantially identical to the light fixture 101 illustrated in FIG. 5 and identical features have been given the same reference numbers as in FIG. 5 and will not be described further. In this embodiment, the stepper motor 111 is connected to a rotation wheel 433 via a belt 435 and the rotation wheel 433 is aligned with the rotation axis 113. The stepper motor 111 is arranged at the rotatable structure 105 and the stepper motor 111 is configured to drive the belt 435 in relation to the rotation wheel causing the rotatable structure 105 to rotate around the rotation axis 113. The rotation wheel 433 is fixed to the stationary structure 103 and is formed as a shaft or attached to a shaft which is fixed to the stationary structure 103. The rotatable structure 105 is rotatably connected to rotation wheel 433, for instance via a bearing 437 or any other structure allowing the rotation of the rotatable structure 105 in relation to the stationary structure. Upon activation of the stepper motor 111, the rotation of the belt 435 results in the rotatable structure 105 rotating around the rotation wheel 435 and it is noted that the stepper motor 111 also rotates around the rotation axis 113.

Figure 9:
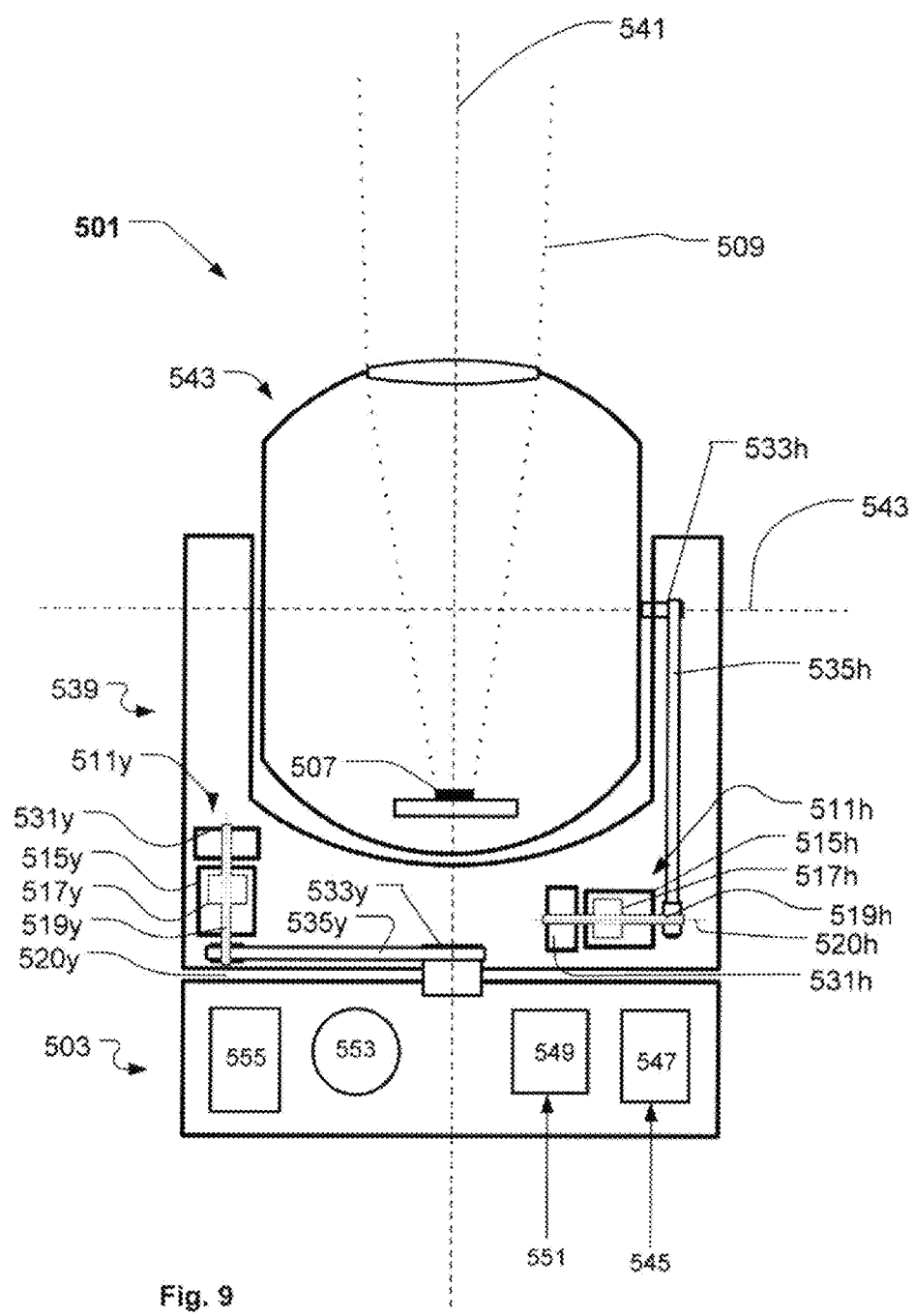
FIG. 9 illustrates a moving head light fixture where a head is rotatable by a stepper motor system in relation to a yoke and where the yoke is rotatable in relation to a base by a stepper motor system.

FIG. 9 illustrates a structural diagram of a moving head light fixture 501 comprising a base 503, a yoke 539 rotatable around a yoke axis 541 by a stepper motor 511$y$. In the illustrated embodiment, the stepper motor 511$y$ is connected to a rotation wheel 533$y$ through a belt 535$y$. The rotation wheel 533$y$ is formed as a shaft (or attached to a shaft) which is fixed in relation to the base 503 and rotatably connected to the yoke 539. The stepper motor 511$y$ comprises a stepper motor stator 515$y$ and a stepper motor rotor 517$y$. The rotor 517$y$ comprises a stepper motor axle 519$y$ rotatable around a motor axis 520$y$. The stepper motor 511$y$ can be any stepper motor known in the art of stepper motors, for instance similar to the stepper motor illustrated in FIG. 6. A damping mass 531$y$ is attached to the stepper motor axle 519$y$ and the damping mass 531$y$ has a rotational inertia in relation to the stepper motor axis which is at least as large as the rotational inertia in relation to the stepper motor axis of the stepper motor rotor 517$y$. As described previously, the damping mass 531$y$ results in the effect that the sound generated by the moving head light fixture 501 upon rotation of the yoke 539 in relation to the base 503 is reduced.

A head 543 is connected rotatably around a head axis 545 to the yoke 539 and is rotatable in relation to the yoke by a stepper motor 511$h$. The head 543 comprises at least one light source 507 generating a light beam 509 (illustrated in dotted lines). In the illustrated embodiment the stepper motor 511$h$ is connected to a rotation wheel 533$h$ through a belt 535$h$. The rotation wheel 533$h$ is formed as a shaft (or attached to a shaft) which is fixed to the head 543 and is rotatably connected to the yoke 539. The stepper motor 511$h$ comprises a stepper motor stator 515$h$ and a stepper motor rotor 517$h$. The stepper motor rotor 517$h$ comprises a stepper motor axle 519$h$ rotatable around a motor axis 520$h$. The stepper motor 511$h$ can be any stepper motor known in the art of stepper motors, for instance similar to the stepper motor illustrated in FIG. 6. A damping mass 531$h$ is attached to the stepper motor axle 519$h$ and the damping mass 531$h$ has a rotational inertia in relation to the stepper motor axis which is at least as large as the rotational inertia in relation to the stepper motor axis of the stepper motor rotor 517$h$. As described previously, the damping mass 531$h$ results in the effect that the sound generated by the moving head light fixture 501 upon rotation of the head 543 in relation to the yoke 539 is reduced.

The base 503 forms a stationary structure of the moving head light fixture 501 and the yoke 539 and head 543 form a rotatable structure of the moving head light fixture 501. Rotation of the head 543 in relation the yoke 539 results in rotation of the light beam 509 around the yoke axis 541 and rotation of the yoke 539 in relation to the base results in rotation of the light beam 509 in relation the yoke axis 541.

As known in the prior art, the moving head light fixture 501 receives electrical power 545 from an external power supply (not shown). The electrical power is received by an internal power supply 547 which adapts and distributes electrical power through internal powerlines (not shown) to the subsystems of the moving head 543. The internal power system can be provided in many different ways, for instance, by connecting all subsystems to the same power line. The skilled person will, however, realize that some of the subsystems in the moving head need different kind of power and that a ground line also can be used. The light source 507 will for instance in most applications need different kind of power than the step motors and driver circuits.

The moving head light fixture 501 also comprises a controller 549 which controls the components (other subsystems) in the moving head light fixture based on an input signal 551 indicative of light effect parameters, such as beam effect parameters, position parameters and other parameters related to the moving head lighting fixture 501. The beam effect parameters relate to the light effects that the light beam 509 should generate and may for instance be color, dimming level, prism effects, gobo effects, iris effects, animation effects, etc. It is noticed that eventual components generating these light effects have not been shown. The input signal 551 also can indicate at least one position parameter related to the position of the head 543 and yoke 539. The input signal 551 can be provided as separate signals (not shown) comprising different parameters or can be provided internally within the light fixture 501, for instance in form of instructions stored in a memory of the light fixture 501. The moving head light fixture 501 also can comprise user input device 553 enabling a user to interact directly with the moving head 543 instead of a light controller to communicate with the moving head 543. The user input device 553 can, for instance, be buttons, joysticks, touch pads, keyboards, mice, etc. The user input device 553 can also be supported by a display 555 enabling the user to interact with the moving head light fixture 501 through a menu system shown on the display using the user input device 553. The display device 555 and user input device 553 can in one embodiment also be integrated as a touch screen.

Figure 10:
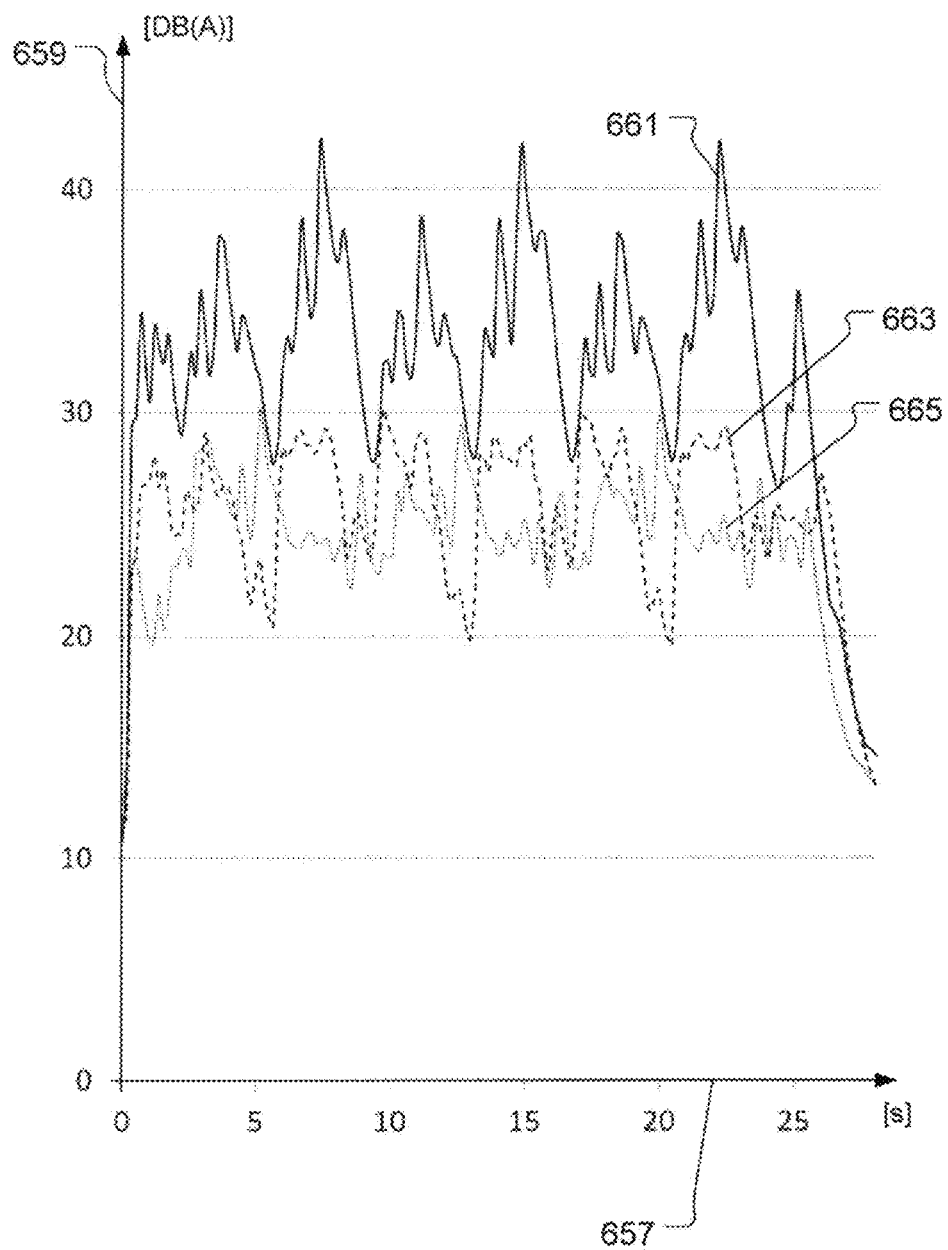
FIG. 10 illustrates graphs of the sound level generated by a moving head light fixture during rotation of a head in relation to a yoke.

FIG. 10 illustrates a graph showing the results of sound measurements made of a moving head light fixture similar to the one illustrated in FIG. 9 made during rotation of the head in relation to the yoke. The sound measurements were made by measuring the dB A-weighted sound level generated by the moving head during identical rotation patterns of the head in relation to the yoke 539, where the head 543:

1. started from a 0 degree position in relation to the yoke,
2. rotated 135 degrees in a first direction,
3. rotated 270 degrees in a second direction (opposite the first direction);
4. rotated 270 degrees in the first direction,
5. rotated 270 degrees in the second direction,
6. rotated 270 degrees in the first direction,
7. rotated 270 degrees in the second direction,
8. rotated 270 degrees in the first direction,
9. rotated 135 degrees in the second direction,
10. stopped in the 0 degree position.

In the 0 degree position, the light beam 509 is emitted straight upward in relation to the base 503 and corresponds to the situation shown in FIG. 9.

The horizontal axis 657 indicates the time in seconds [s], and the vertical axis 659 indicates the A-weighted sound level in dB [dB(A)].

The solid graph 661 illustrates the measured sound level during the rotation pattern with the stepper motor 511y rotating the head 543 in relation to the yoke 539 without adding a damping mass 531 to the stepper motor axle 520.

The dashed graph 663 illustrates the measured sound level during the rotation pattern with the stepper motor rotating the head in relation to the yoke with the damping mass 731 illustrated in FIG. 10-12 added to the stepper motor axle.

The dotted graph 665 illustrates the measured sound level during the rotation pattern with the stepper motor rotating the head in relation to the yoke with the damping mass 831 illustrated in FIG. 14-16 added to the stepper motor axle.

The graphs clearly show that the sound is reduced when adding the damping masses 731 or 831 to the motor axle of the moving head as the sound level during the rotations of the head in relation to the head without the damping mass primarily lies within the 30-40 dB range, whereas the sound level with either damping mass 731 or 831 primarily lies within the 20-30 dB range. Thus the sound level generated during rotation of the head of a moving head light fixture can clearly be reduced by adding a damping mass to the motor axle of the stepper motor.

The stepper motor rotor of the stepper motor of the moving head light fixture used for the measure sound level measurements has rotational inertia in relation to the stepper motor axis of 26 kg mm² and the weight to the stepper motor rotor is 190 g.

FIGS. 11-13 illustrate a damping mass 731 which can be used as a damping mass of the light fixture according to the present invention; where FIG. 11 illustrates a top view, FIG. 12 illustrates a cross sectional view through line A-A, and FIG. 13 illustrates a perspective view. The damping mass 731 is formed as a substantial cylindrical body having a mounting hole 767 wherein a stepper motor axle can be arranged allowing the damping mass 731 to be attached to the stepper motor axle. The damping mass comprises threaded hole 769 ending in a mounting hole. A screw can then be inserted into the threaded hole and be screwed onto the stepper motor axle in order to fix the damping mass to the stepper motor axle.

The damping mass illustrated in FIGS. 11-13 was used when measuring the sound level indicated by the dashed graph 663 of FIG. 10. The damping mass was made of aluminum and has a weight of 723 g and a rotational inertia in relation to the stepper motor axis of 406 kg mm². As a consequence, in an embodiment the damping mass has a rotational inertia in relation to the stepper motor axis, which is at least 15 times larger than the rotational inertia in relation to the stepper motor axis of the stepper motor rotor. Also, the damping mass has a mass which is at least 3 times larger than the mass of the stepper motor.

FIGS. 14-16 illustrate a damping mass 831 which can be used as a damping mass of the light fixture according to the present invention; where FIG. 14 illustrates a top view, FIG. 8b illustrates a cross sectional view through line B-B, and FIG. 15 illustrates a perspective view. The damping mass 831 is formed as a cone frustrum with a top cylinder and a bottom cylinder. A mounting hole 867 has been made in the top cylinder and a stepper motor axle can be arranged in the mounting hole allowing the damping mass to be attached to the stepper motor axle. The damping mass comprises threaded hole 869 ending the mounting hole. A screw can then be inserted into the threaded hole and be screwed onto the stepper motor axle to fix the damping mass to the stepper motor axle.

The damping mass illustrated in FIGS. 14-16 was used when measuring the sound level indicated by the dotted graph 665 of FIG. 10. The damping mass was made of steel and has a weight of 259 g and a rotational inertia in relation the stepper motor axis of 89 kg mm². As a consequence, in an embodiment, the damping mass has a rotational inertia in relation to the stepper motor axis which is at least 3 times larger than the rotational inertia in relation to the stepper motor axis of the stepper motor rotor. Also, the damping mass has a mass which is at least 1.3 times larger than the mass of the stepper motor.

Figure 17:
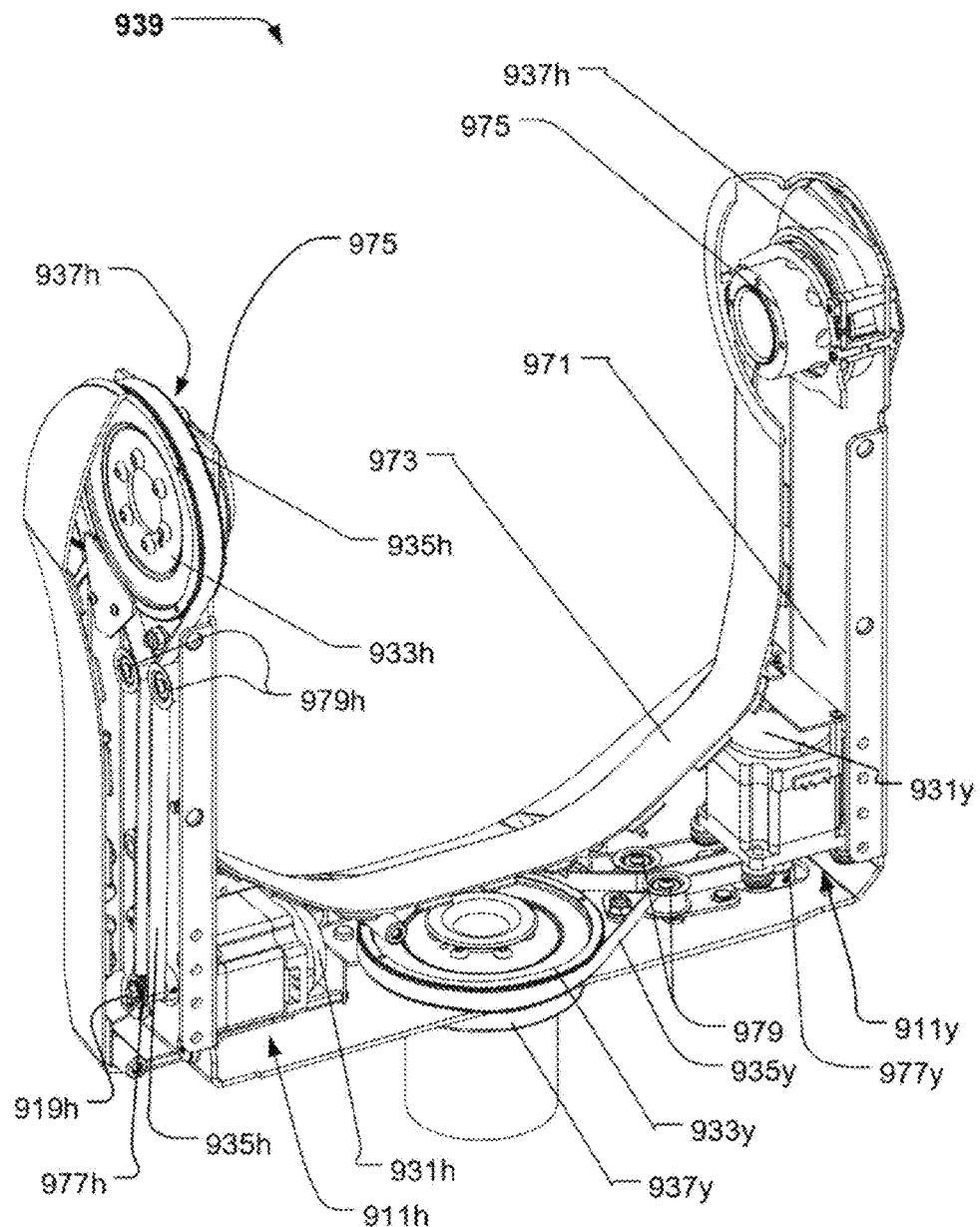
FIG. 17 illustrates a yoke of a moving head light fixture.

FIG. 17 illustrates a perspective view of the yoke 939 for a moving head light fixture. The yoke 939 comprises a frame 971 supporting the components arranged at the yoke 939. The frame is covered by a pair of yoke shells 973 where one of them has been removed in order to make the components inside the yoke shells 973 visible.

The yoke arms support two bearings 937h which are rotatably connected to a head shaft 975 to which a head (not shown) can be fixed allowing the head to rotate in relation to the yoke 939. A rotation wheel 933h is fixed to the head shaft and connected to a stepper motor 911h via a belt 935h. The stepper motor 911h can be any stepper motor known in the art of stepper motors, for instance, similar to the stepper motor illustrated in FIG. 6, and comprises a stepper motor stator and a stepper motor rotor. The rotor comprises a stepper motor axle 919h rotatable around a motor axis. A damping mass 931h is attached to the stepper motor axle 919h and has a rotational inertia in relation to the stepper motor axis which is at least as large as the rotational inertia in relation to the stepper motor axis of the stepper motor rotor. The damping mass 931h is illustrated in further detail in FIGS. 10a-10c and results in the effect that the sound generated by the moving head light fixture upon rotation of the head in relation to the yoke is reduced. A toothed wheel 977h has also been added to the motor axle and serves to drive the belt 935h, which comprises mating tooth and a number of pulleys 979h that serve to guide the belt.

The yoke 939 is rotatably connected to yoke shaft 981 via a bearing 937h and a rotation wheel 933y is fixed to the yoke shaft 981. The yoke shaft 981 is fixed to a base (not shown) and the yoke 939 can thus rotate in relation to the yoke shaft 981, the rotation wheel 933y and the base. The rotation wheel 933y is connected to a stepper motor 911y via a belt 935y. The stepper motor 911y can be any stepper motor known in the art of stepper motors, for instance similar to the stepper motor illustrated in FIG. 6 and comprises a stepper motor stator and a stepper motor rotor. The rotor comprises a stepper motor axle (not visible) rotatable around a motor axis. A damping mass 931y is attached to the stepper motor axle and has a rotational inertia in relation to the stepper motor axis which is at least as large as the rotational inertia in relation to the stepper motor axis of the stepper motor rotor. The damping mass 931y is illustrated in further detail in FIGS. 21-23 and results in the effect that the sound generated by the moving head light fixture upon rotation of the head in relation to the yoke 939 is reduced. A toothed wheel 977y has also been added to the motor axle and serves to drive the belt 935y, which comprises mating tooth and a number of pulleys 979y that serve to guide the belt 935y.

The stepper motor rotors of stepper motors used in this yoke 939 have rotational inertia in relation to the stepper motor axis of 26 kg mm² and the weight to the stepper motor rotor is 190 g.

Figure 18:
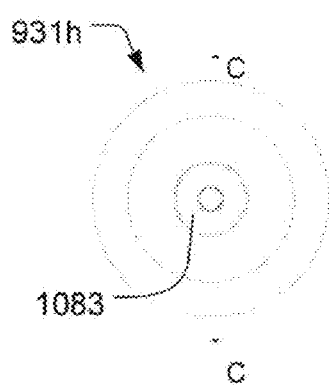
FIG. 18 illustrates another damping mass for a stepper motor system of a light fixture.
Figure 19:
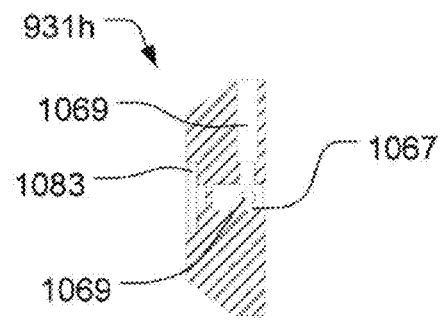
FIG. 19 illustrates another damping mass for a stepper motor system of a light fixture.
Figure 20:
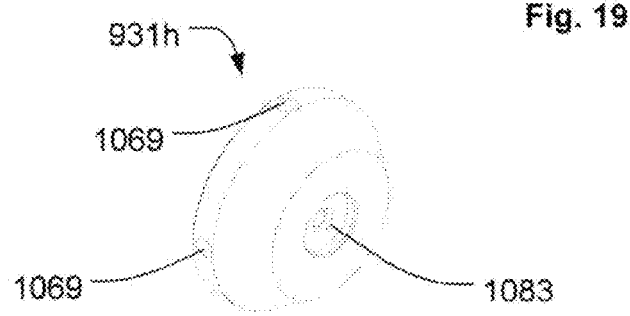
FIG. 20 illustrates another damping mass for a stepper motor system of a light fixture.

FIGS. 18-20 illustrate a damping mass 931h which can be used as a damping mass of the light fixture according to the present invention; where FIG. 18 illustrates a top view, FIG. 19 illustrates a cross sectional view through line C-C, and FIG. 20 illustrates a perspective view. The damping mass 931h is used in the yoke 939 illustrated in FIG. 17 and is formed as a cone frustrum with a bottom cylinder. A mounting hole 1067 has been made in the bottom cylinder and a stepper motor axle can be arranged in the mounting hole allowing the damping mass to be attached to the stepper motor axle. The damping mass 931h comprises two perpendicular threaded holes 1069 ending in the mounting hole. A screw can then be inserted into the threaded holes and be screwed onto the stepper motor axle in order to fix the damping mass to the stepper motor axle and due to the fact that threaded holes are perpendicular the damping mass is prevented from tilting in relation to the stepper motor axle. The damping mass 931h comprises also a hole 1083 in the upper part which can be used to accommodate a magnet and eventually also a magnetic sensor which is used for encoding the angular position of the stepper motor axle as known in the art of moving head light fixtures. The shape of the damping mass 931h has been designed to provide as large rotational inertia as possible within the given allowed space within the yoke shells, for instance the conical shape of the damping mass 931h has been provided in order for the damping mass to fit with inside the yoke shell of the yoke shown in FIG. 17.

The damping mass 931h is made of steel, has a weight of 257 g and a rotational inertia in relation to the stepper motor axis of 84 kg mm². As a consequence, in an embodiment, the damping mass 931h has a rotational inertia in relation to the stepper motor axis which is at least 3 times larger than the rotational inertia in relation to the stepper motor axis of the stepper motor rotor. Also, the damping mass has a mass which is at least 1.3 times larger than the mass of the stepper motor.

Figure 21:
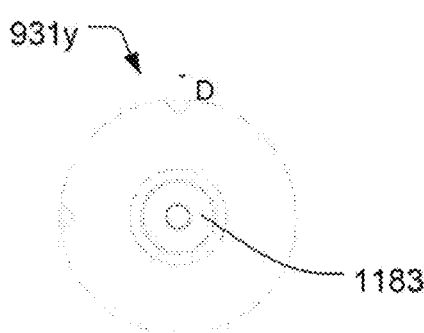
FIG. 21 illustrates another damping mass for a stepper motor system of a light fixture.
Figure 22:
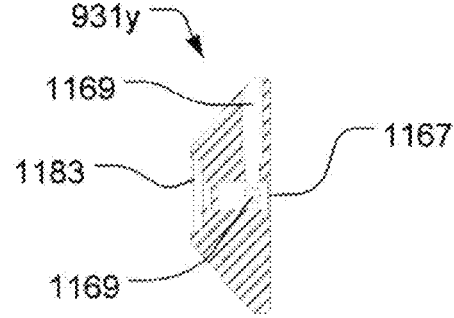
FIG. 22 illustrates another damping mass for a stepper motor system of a light fixture.
Figure 23:
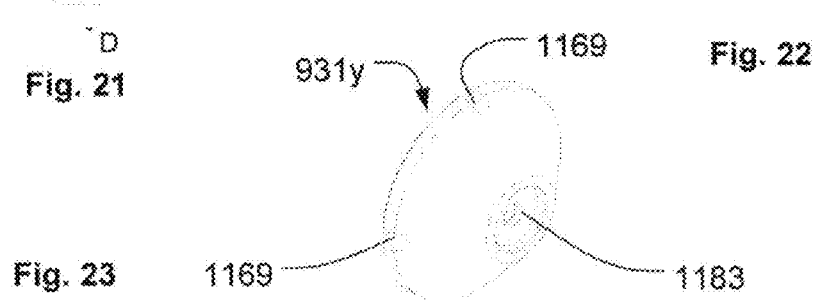
FIG. 23 illustrates another damping mass for a stepper motor system of a light fixture.

FIGS. 21-23 illustrate a damping mass 931y which can be used as a damping mass of the light fixture according to the present invention; where FIG. 21 illustrates a top view, FIG. 22 illustrates a cross sectional view through line C-C, and FIG. 23 illustrates a perspective view. The damping mass 931h is formed as a cone frustrum with a bottom cylinder. A mounting hole 1167 has been made in the bottom cylinder and a stepper motor axle can be arranged in the mounting hole 1167 allowing the damping mass to be attached to the stepper motor axle. The damping mass comprises two perpendicular threaded holes 1169 ending in the mounting hole. A screw can then be inserted into each of the threaded holes 1169 and be screwed onto the stepper motor axle in order to fix the damping mass to the stepper motor axle and due to the fact that threaded holes 1169 are perpendicular, the damping mass is prevented from tilting in relation to the stepper motor axle. The damping mass comprises also a hole 1183 in the upper part which can be used to accommodate a magnet and eventual a magnetic encoder which is used for encoding the angular position of the stepper motor axle as known in the art of moving head light fixtures.

The damping mass is made of steel, has a weight of weight of 191 g and a rotational inertia in relation to the stepper motor axis of 55 kg mm². As a consequence, in an embodiment, the damping mass has a rotational inertia in relation to the stepper motor axis which is at least 2 times larger than the rotational inertia in relation to the stepper motor axis of the stepper motor rotor. Also, the damping mass has a mass which is substantially equal to the mass of the stepper motor.

The damping mass is illustrated to be attached to stepper motor axle at the back side of the stepper motor, however, it is noted that the damping mass also can be attached at the front side of the stepper motor. Additionally, is it noted that the damping mass can be made of any material capable of providing a sufficiently large rotational inertia in relation the stepper motor axle.

Figure 24:
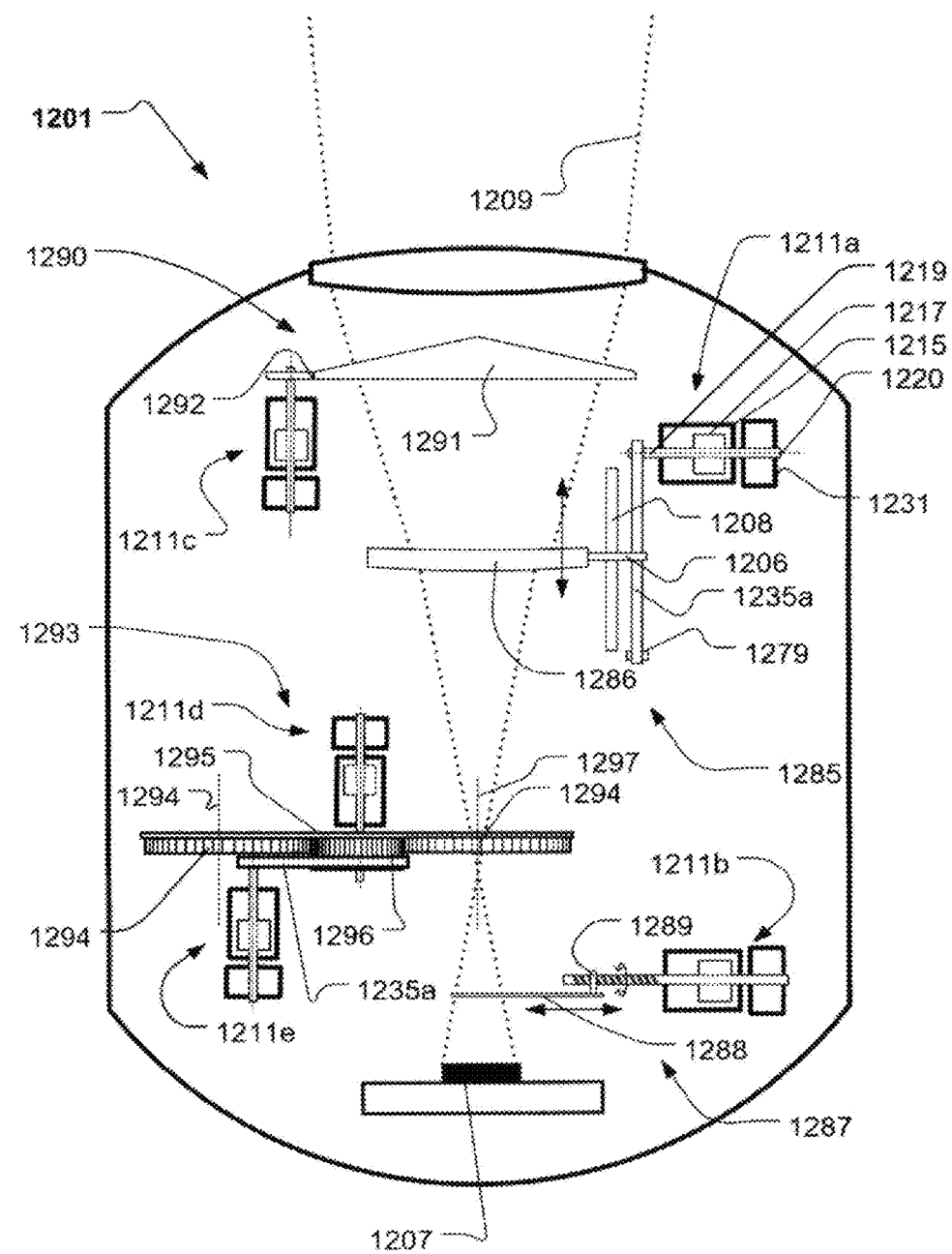
FIG. 24 illustrates a light fixture where light modifying elements are movable in relation to a light beam by a stepper motor system.

FIG. 24 illustrates a structural diagram of a light fixture 1201 according to one aspect of the present invention. The light fixture comprises a light source 1207 generating a light beam 1209.

The light fixture 1201 comprises a number of stepper motor systems (similar to the ones shown in FIGS. 1-4) and each stepper motor system comprises at least one stepper motor 1211a-1211e comprising a stepper motor stator 1215 and a stepper motor rotor 1217. The stepper motor rotor comprises a stepper motor axle 1219 rotatable around a motor axis 1220. The stepper motor is connected to a movable object and is configured to move the movable object in relation to a reference point. The reference numbers 1215, 1217, 1219 and 1220 have only been indicated for one of the stepper motor systems, as the stepper motors in FIG. 24 are illustrated identically. The movable object is provided as different kinds of light modifying elements capable of modifying the light beam and the light beam constitutes the reference point. As described previously the stepper motor comprises a damping mass 1231 configured to reduce the sound generated by the stepper motor system. The light modifying elements can for instance be optical elements such as optical lenses, light mixing rods, optical prisms. The light modifying elements can also be color flites filtering different color of the light, beam forming elements such as gobos, framing blades, animation wheels, irises, and textured glass structures, etc.

The light fixture 1201 comprises an optical zoom/focus system 1285 where the light modifying element is provided as an optical lens 1286 which can be moved along the light beam 1209 in order to provide a zoom/focus effect to the light beam 1209. The optical lens 1286 is connected to a carrier 1206 which is movably connected to a guiding track 1208 and is fixed to a belt 1235a. The belt 1235a is rotatable around the stepper motor axle and a pulley 1279. As a consequence, the stepper motor can move the optical lens 1286 along the light beam 1209.

The light fixture 1201 comprises a color system 1287 where a color filter 1288 can be moved into the light beam 1209. Stepper motor axle is formed as a spindle 1210 having a thread and the color filter is connected to the spindle via a mating mechanism 1289 which can be screwed on to the thread of the spindle 1210 causing the color filter to be moved in and out of the light beam 1209 upon rotation of the spindle 1210. The color filter can be any kind of color filter capable of providing some filtering of the spectral components of the light beam 1209.

The light fixture 1201 comprises a prism system 1290 comprising an optical prism 1291 capable of diffracting the light beam 1209, for instance, to create a multiple number of projections of a GOBO pattern. The optical prism is rotatable in relation to the light beam 1209 by the stepper motor 1211c, for instance by a gear 1292 or the like interacting with the peripheral edge of the prism, e.g. through a toothed wheel (not shown) or belt (not shown).

The light fixture 1201 comprises a rotating gobo system 1293 where a number of rotating gobos 1294 is arranged at a gobo wheel 1295. The gobo wheel 1295 is connected to the end of the stepper motor axle of stepper motor 1211d and stepper motor 1211d can thus rotate the gobo wheel in relation to the light beam whereby different gobos can be arranged into the light beam. The gobo wheel comprises a center gear 1296 configured to rotate the gobos around a gobo axis 1297. The center gear 1296 is rotated by stepper motor 1211e which rotates the center gear via a belt 1235e. The gobo system can, for instance, be provided as shown in WO 0137032 A2.

The illustrated systems are only examples of light modifying systems where a stepper motor is configured to move a light modifying element in relation to the light beam and the skilled person will realize the stepper motor system comprising a damping mass attached to the stepper motor axle can be used in a kind of light modifying system where a stepper motor is configured to move a light modifying element, for instance iris systems, framing systems, dimmer systems, animation systems, CMY color mixing systems, color systems, gobos, prism, zoom/focus systems, etc.

Figure 25:
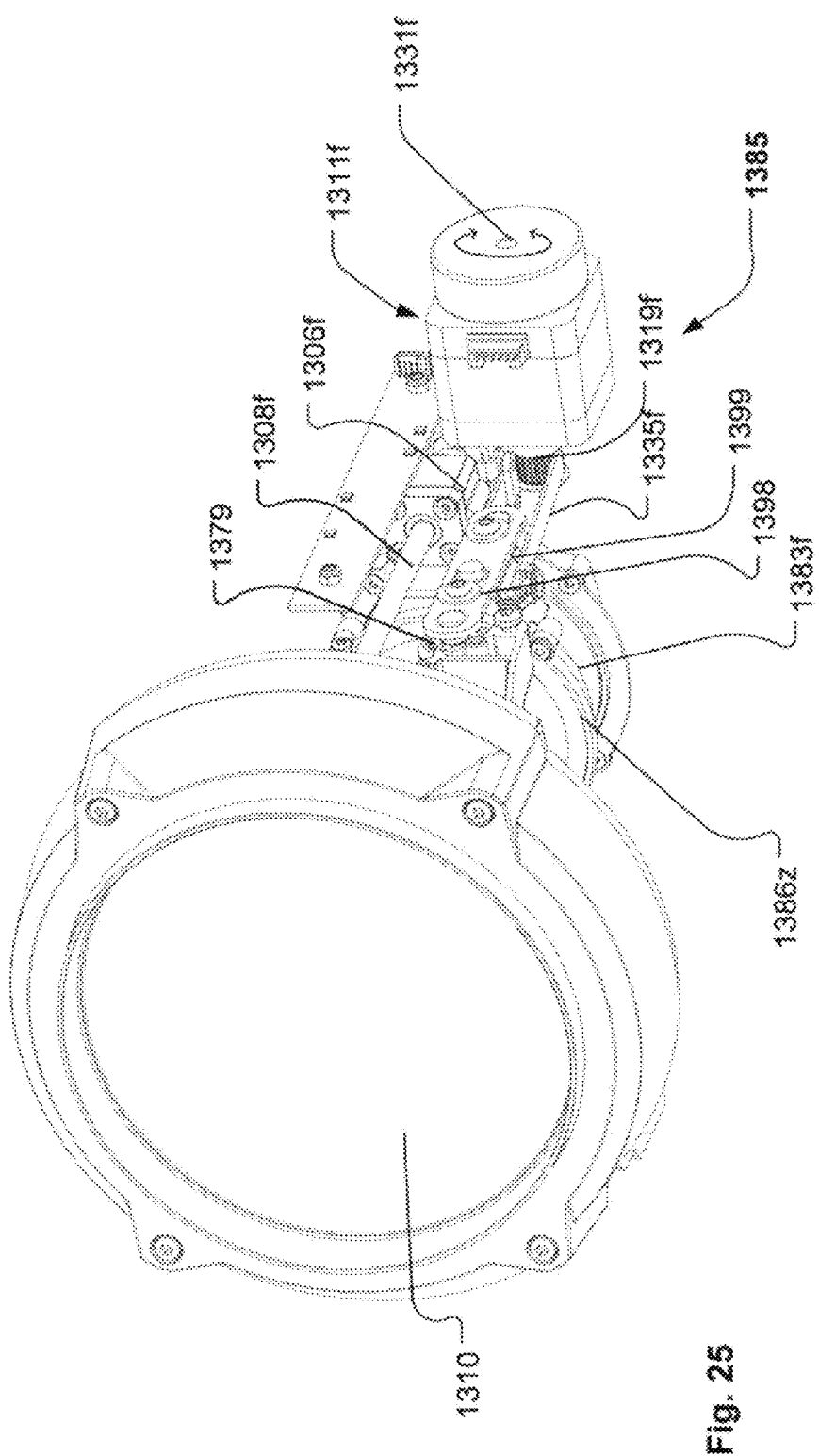
FIG. 25 illustrates a zoom/focus system of a light fixture where a zoom/focus lens is movable in relation to a light beam by a stepper motor system.

FIG. 25 illustrates a zoom/focus system 1385 of a light fixture comprising a light source (not shown) generating a light beam (not shown). The light beam passes through the zoom/focus system 1385 before leaving the light fixture through a front lens 1310. The zoom/focus system 1385 comprises a zoom lens 1386z and a focus lens 1386f which are movable along the light beam. The focus lens 1386f is connected to a carrier 1306f which is movably connected to a guiding track 1608f and is fixed to a belt 1335f The belt 1335f is rotatable around the stepper motor axle 1319f and a pulley 1379. The pulley 1379 is attached to a belt tighten mechanism 1398 comprising a belt tighten spring 1399 configured (barely visible) to provide a tighten force to the pulley 1379 in order to hold the belt 1335f tight. As a consequence, the stepper motor can move the optical lens along the light beam. The stepper motor 1311f comprises a damping mass 1331f configured to reduce the sound generated by the stepper motor system as described previously. The zoom lens 1386z is connected to a similar stepper motor system, however, these features are not visible in the drawing.

Another aspect of the present invention relates to a method of damping the sound generated by a light fixture, where the light fixture includes: at least one light source generating a light beam, a movable object, and a stepper motor configured to move the movable object. The stepper motor comprises a stepper motor stator and a stepper motor rotor, and the stepper motor rotor comprises a stepper motor axle and is rotatable around a stepper motor axis.

The method includes the step of attaching a damping mass to the stepper motor axle where the damping mass has a rotational inertia in relation to the stepper motor axis which is at least as large as the rotational inertia of the stepper motor rotor in relation to the stepper motor axis.

The method makes it possible to reduce the sound generated by a light fixture when a stepper motor moves a movable object of the light fixture. As described previously, this is achieved as by attaching the damping mass to the stepper motor axle resulting in the fact that the vibration generated by the stepper motor is reduced whereby less sound is generated.

The method can further include a step of arranging the damping mass rotational symmetric in relation to the stepper motor axle as this results in the fact that the damping mass does not itself generate additional vibrations potentially generating additional sound.

The method can further include a step of providing the movable object as a light modifying element configured to modify the light beam and the step of moving the light modifying element in relation to the light beam using the stepper motor.

The method can further include a step of providing the movable object as a rotatable structure rotatably connected to a support structure; where the rotatable structure comprises the light source; and the step of rotating the rotatable structure in relation to the support structure around a rotation axis using the stepper motor. This makes it possible to reduce the sound generated by rotating the head and/or yoke of a moving head light fixture.

The method can be used to ensure that sound of new light fixtures is minimized and also to reduce the sound generated by existing light fixtures as a damping mass can be added relatively easy to existing stepper motors of light fixtures.

It is noticed that the stepper motor systems illustrated in FIGS. 1-4 also can be used in connection with other devices where a movable structure is moved by a stepper motor, for instance, in surveillance cameras where the cameras can be moved in pan or tilt directions, in printing machines where a printer head is movable in relation to a paper, in 3D printing machines where the 3D printing head is moved in relation to the object being printed, in laser or water jets cutting machines where a laser or water jet is moved in relation to the object being cut, or in the field of robotics where the robots comprise movable objects. A common issue with a stepper motor system used in this field of technology is that the stepper motor system generates sound which can be annoying to persons near such devices. Thus, the stepper motor system disclosed herein can also be used to reduce the sound generated by such systems, for instance, by a stepper motor system according to the following statements:

Statement 1:

A stepper motor system comprising a stepper motor, where the stepper motor comprises a stepper motor stator and a stepper motor rotor, where the stepper motor rotor comprises a stepper motor axle and is rotatable around a stepper motor axis; the stepper motor is connected to a movable object and is configured to move the movable object in relation to a reference point, wherein a damping mass is attached to the stepper motor axle, the damping mass having a rotational inertia in relation to the stepper motor axis which is at least as large as the rotational inertia of the stepper motor rotor in relation to the stepper motor axis.

Statement 2:

The stepper motor system where the damping mass has a mass at least as large as the mass of the stepper motor rotor.

Statement 3:

The stepper motor system where the damping mass is rotational symmetric around the rotational axis of the stepper motor axle.

Statement 4:

The stepper motor system where the stepper motor is configured to transitionally move the movable object in relation to the reference point.

Statement 5:

The stepper motor system where the stepper motor is configured to rotate the movable object in relation to the reference point.

Statement 6:

The stepper motor system where the stepper motor is connected to the movable object via a belt mechanism, and the stepper motor is configured to drive the belt causing the movable object to move in relation to the reference point.

Statement 7:

A method of damping the sound generated by movement of a movable object by a stepper motor. The method includes the steps of: configuring a stepper motor to move the movable object in relation to a reference point by connecting the stepper motor to the movable object, where the stepper motor comprises a stepper motor stator and a stepper motor rotor, where the stepper motor rotor comprises a stepper motor axle and is rotatable around a stepper motor axis. The method further includes: attaching a damping mass to the stepper motor axle where the damping mass has a rotational inertia in relation to the stepper motor axis which is at least as large as the rotational inertia of the stepper motor rotor in relation to the stepper motor axis.

Statement 8:

The method where the damping mass has a mass at least as large as the mass of the stepper motor rotor.

Statement 9:

The method where the step of attaching the damping mass to the stepper motor axle comprises a step of arranging the damping mass rotationally symmetric in relation to the stepper motor axle.

Statement 10:

The method further including the step of transitionally moving the movable object in relation to the reference point is performed using the stepper motor.

Statement 11:

The method further including the step of rotating the movable object in relation to the reference point.

What is claimed is:

1. A light fixture comprising:
   at least one light source generating a light beam; and
   a stepper motor including a stepper motor stator and a stepper motor rotor, where the stepper motor rotor comprises a stepper motor axle and is rotatable around a stepper motor axis; the stepper motor is connected to a movable object and is configured to move the movable object in relation to a reference point to modify the light beam as generated by the at least one light source;
   wherein a damping mass is attached to the stepper motor axle, the damping mass having a rotational inertia in relation to the stepper motor axis which is at least as large as the rotational inertia of the stepper motor rotor in relation to the stepper motor axis.

2. The light fixture according to claim 1, wherein the damping mass has a mass at least as large as the mass of the stepper motor rotor.

3. The light fixture according to claim 1, wherein the damping mass is attached to the stepper motor axle at a position outside the stepper motor stator.

4. The light fixture according to claim 1, wherein the damping mass is rotationally symmetric around a rotational axis of the stepper motor axle.

5. The light fixture according to claim 1, wherein the stepper motor is connected to the movable object via a belt mechanism, and the stepper motor is configured to drive the belt causing the movable object to move in relation to the reference point.

6. The light fixture according to claim 1, wherein the movable object comprises a light modifying element configured to modify the light beam and wherein the light modifying element is movable in relation to the light beam.

7. The light fixture according to claim 6, wherein the light modifying element comprises an optical element movable in relation to the light beam.

8. The light fixture according to claim 6, wherein the light modifying element comprises a color flag which is movable in relation to the light beam.

9. The light fixture according to claim 6, wherein the light modifying element comprises a gobo which is movable in relation to the light beam.

10. The light fixture according to claim 1 comprising;
    a support structure; and
    a rotatable structure rotatably connected to the support structure; the rotatable structure comprises the light source;
    wherein the movable object comprises the rotatable structure and where the stepper motor is configured to rotate the rotatable structure in relation to the support structure around a rotation axis.

11. The light fixture according to claim 10, wherein the stepper motor is connected to a rotation wheel via a belt, the rotation wheel is aligned with the rotation axis and the stepper motor is configured to drive the belt in relation to the rotation wheel causing the rotatable structure to rotate around the rotation axis.

12. The light fixture according to claim 10, wherein the support structure is formed as a base of a moving head light fixture, where a yoke is rotatably connected to the base, and where the rotatable structure forms a head rotatably connected to the yoke; wherein the stepper motor is provided as at least one of the following:
    a yoke stepper motor configured to rotate the yoke in relation to the base, and
    a head stepper motor configured to rotate the head in relation to the yoke.

13. A method of damping sound generated by a light fixture comprising:
    generating a light beam with at least one light source;
    moving a moveable object with a stepper motor to modify the light beam as generated by the at least one light source; where the stepper motor includes a stepper motor stator and a stepper motor rotor, and where the stepper motor rotor comprises a stepper motor axle and is rotatable around a stepper motor axis; and
    attaching a damping mass to the stepper motor axle where the damping mass has a rotational inertia in relation to the stepper motor axis which is at least as large as the rotational inertia of the stepper motor rotor in relation to the stepper motor axis.

14. The method according to claim 13, wherein the damping mass has a mass at least as large as the mass of the stepper motor rotor.

15. The method according to claim 13, wherein the step of attaching the damping mass to the stepper motor axle comprises a step of arranging the damping mass rotationally symmetric in relation to the stepper motor axle.

16. The method according to claim 13, wherein the method includes the step of providing the moveable object as a light modifying element configured to modify the light beam and the step of moving the light modifying element in relation to the light beam using the stepper motor.

17. The method according to claim 13, wherein the method comprises the step of providing the moveable object as a rotatable structure rotatably connected to a support structure; the rotatable structure comprises the light source; and the step of rotating the rotatable structure in relation to the support structure around a rotation axis using the stepper motor.

18. A light fixture comprising:
at least one light source generating a light beam; and
a stepper motor including a stepper motor rotor, where the stepper motor rotor comprises a stepper motor axle and is rotatable around a stepper motor axis; the stepper motor is connected to a movable object and is configured to move the movable object in relation to a reference point to modify the light beam as generated by the at least one light source;
wherein a damping mass is attached to the stepper motor axle, the damping mass having a rotational inertia in relation to the stepper motor axis which is at least as large as the rotational inertia of the stepper motor rotor in relation to the stepper motor axis.

19. The light fixture according to claim 18, wherein the damping mass includes a mass at least as large as the mass of the stepper motor rotor.

20. The light fixture according to claim 18, wherein the damping mass is attached to the stepper motor axle at a position outside of a stepper motor stator of the stepper motor.

* * * * *